US010714018B2

(12) United States Patent
Zahirovic et al.

(10) Patent No.: US 10,714,018 B2
(45) Date of Patent: Jul. 14, 2020

(54) SYSTEM AND METHOD FOR LOADING IMAGE CORRECTION DATA FOR DISPLAYS

(71) Applicant: Ignis Innovation Inc., Waterloo (CA)

(72) Inventors: Nino Zahirovic, Waterloo (CA); Shuenn-Jiun Tang, Guelph (CA)

(73) Assignee: Ignis Innovation Inc., Waterloo (CA)

(*) Notice: Subject to any disclaimer, the term of this patent is extended or adjusted under 35 U.S.C. 154(b) by 63 days.

(21) Appl. No.: 15/597,947

(22) Filed: May 17, 2017

(65) Prior Publication Data
US 2018/0336827 A1    Nov. 22, 2018

(51) Int. Cl.
G09G 3/3275    (2016.01)
G09G 3/3208    (2016.01)
(Continued)

(52) U.S. Cl.
CPC ......... G09G 3/3275 (2013.01); G09G 3/2096 (2013.01); G09G 3/3208 (2013.01);
(Continued)

(58) Field of Classification Search
CPC ............... G09G 3/3677; G09G 3/2096; G09G 2310/0202; G09G 2300/0809; G09G 2310/065; G09G 2300/0426; G09G 3/3275; G09G 3/3208; G09G 5/10; G09G 2320/0285; G09G 2370/04; G09G 2370/02; G09G 2330/026; G09G 2320/043;
(Continued)

(56) References Cited

U.S. PATENT DOCUMENTS 4,354,162 A    10/1982    Wright
4,758,831 A    7/1988    Kasahara et al.
(Continued)

FOREIGN PATENT DOCUMENTS

CA    1294034    1/1992
CA    2109951    11/1992
(Continued)

OTHER PUBLICATIONS

Ahnood et al.: "Effect of threshold voltage instability on field effect mobility in thin film transistors deduced from constant current measurements"; dated Aug. 2009 (3 pages).
(Continued)

Primary Examiner — Grant Sitta
(74) Attorney, Agent, or Firm — Stratford Managers Corporation

(57) ABSTRACT

Active-Matrix Organic Light-Emitting Diode (AMOLED) displays exhibit differences in luminance on a pixel to pixel basis, primarily as a result of process or construction inequalities, or from aging caused by operational use over time. To facilitate image correction, the initial non-uniformity correction data is obtained using methods, such as electrical measurement or a combination of electrical and optical measurement. Typically, the correction data is then stored on a non-volatile-memory chip on the display module itself. The proposed invention offers an alternate method for storing and loading the image correction data, thereby eliminating the need for memory chip in the display module.

20 Claims, 7 Drawing Sheets

(51) Int. Cl.
  *G09G 3/20* (2006.01)
  *G09G 5/10* (2006.01)
  *H04N 5/57* (2006.01)

(52) U.S. Cl.
  CPC .................. *G09G 5/10* (2013.01); *H04N 5/57* (2013.01); *G09G 2300/0408* (2013.01); *G09G 2320/0233* (2013.01); *G09G 2320/0285* (2013.01); *G09G 2320/043* (2013.01); *G09G 2330/026* (2013.01); *G09G 2330/08* (2013.01); *G09G 2330/12* (2013.01); *G09G 2360/08* (2013.01); *G09G 2370/02* (2013.01); *G09G 2370/04* (2013.01)

(58) Field of Classification Search
  CPC ........... G09G 2330/12; G09G 2360/08; G09G 2300/0408; G09G 2320/0233; G09G 2330/08; G09G 3/3225; G09G 2300/0842; G02F 1/1345; G02F 1/13306; H04N 5/57
  See application file for complete search history.

(56) References Cited

U.S. PATENT DOCUMENTS

| | | | |
|---|---|---|---|
| 4,963,860 A | 10/1990 | Stewart |
| 4,975,691 A | 12/1990 | Lee |
| 4,996,523 A | 2/1991 | Bell et al. |
| 5,051,739 A | 9/1991 | Hayashida et al. |
| 5,222,082 A | 6/1993 | Plus |
| 5,266,515 A | 11/1993 | Robb et al. |
| 5,498,880 A | 3/1996 | Lee et al. |
| 5,589,847 A | 12/1996 | Lewis |
| 5,619,033 A | 4/1997 | Weisfield |
| 5,648,276 A | 7/1997 | Hara et al. |
| 5,670,973 A | 9/1997 | Bassetti et al. |
| 5,684,365 A | 11/1997 | Tang et al. |
| 5,686,935 A | 11/1997 | Weisbrod |
| 5,712,653 A | 1/1998 | Katoh et al. |
| 5,714,968 A | 2/1998 | Ikeda |
| 5,747,928 A | 5/1998 | Shanks et al. |
| 5,748,160 A | 5/1998 | Shieh et al. |
| 5,784,042 A | 7/1998 | Ono et al. |
| 5,790,234 A | 8/1998 | Matsuyama |
| 5,815,303 A | 9/1998 | Berlin |
| 5,870,071 A | 2/1999 | Kawahata |
| 5,874,803 A | 2/1999 | Garbuzov et al. |
| 5,880,582 A | 3/1999 | Sawada |
| 5,903,248 A | 5/1999 | Irwin |
| 5,917,280 A | 6/1999 | Burrows et al. |
| 5,923,794 A | 7/1999 | McGrath et al. |
| 5,952,789 A | 9/1999 | Stewart et al. |
| 5,990,629 A | 11/1999 | Yamada et al. |
| 6,023,259 A | 2/2000 | Howard et al. |
| 6,069,365 A | 5/2000 | Chow et al. |
| 6,081,131 A | 6/2000 | Ishii |
| 6,091,203 A | 7/2000 | Kawashima et al. |
| 6,097,360 A | 8/2000 | Holloman |
| 6,144,222 A | 11/2000 | Ho |
| 6,157,583 A | 12/2000 | Starnes et al. |
| 6,166,489 A | 12/2000 | Thompson et al. |
| 6,177,915 B1 | 1/2001 | Beeteson et al. |
| 6,225,846 B1 | 5/2001 | Wada et al. |
| 6,229,508 B1 | 5/2001 | Kane |
| 6,232,939 B1 | 5/2001 | Saito et al. |
| 6,246,180 B1 | 6/2001 | Nishigaki |
| 6,252,248 B1 | 6/2001 | Sano et al. |
| 6,259,424 B1 | 7/2001 | Kurogane |
| 6,274,887 B1 | 8/2001 | Yamazaki et al. |
| 6,288,696 B1 | 9/2001 | Holloman |
| 6,300,928 B1 | 10/2001 | Kim |
| 6,303,963 B1 | 10/2001 | Ohtani et al. |
| 6,306,694 B1 | 10/2001 | Yamazaki et al. |
| 6,307,322 B1 | 10/2001 | Dawson et al. |
| 6,316,786 B1 | 11/2001 | Mueller et al. |
| 6,320,325 B1 | 11/2001 | Cok et al. |
| 6,323,631 B1 | 11/2001 | Juang |
| 6,323,832 B1 | 11/2001 | Nishizawa et al. |
| 6,345,085 B1 | 2/2002 | Yeo et al. |
| 6,348,835 B1 | 2/2002 | Sato et al. |
| 6,365,917 B1 | 4/2002 | Yamazaki |
| 6,373,453 B1 | 4/2002 | Yudasaka |
| 6,384,427 B1 | 5/2002 | Yamazaki et al. |
| 6,392,617 B1 | 5/2002 | Gleason |
| 6,399,988 B1 | 6/2002 | Yamazaki |
| 6,414,661 B1 | 7/2002 | Shen et al. |
| 6,420,758 B1 | 7/2002 | Nakajima |
| 6,420,834 B2 | 7/2002 | Yamazaki et al. |
| 6,420,988 B1 | 7/2002 | Azami et al. |
| 6,433,488 B1 | 8/2002 | Bu |
| 6,445,376 B2 | 9/2002 | Parrish |
| 6,468,638 B2 | 10/2002 | Jacobsen et al. |
| 6,489,952 B1 | 12/2002 | Tanaka et al. |
| 6,501,098 B2 | 12/2002 | Yamazaki |
| 6,501,466 B1 | 12/2002 | Yamagashi et al. |
| 6,512,271 B1 | 1/2003 | Yamazaki et al. |
| 6,518,594 B1 | 2/2003 | Nakajima et al. |
| 6,524,895 B2 | 2/2003 | Yamazaki et al. |
| 6,531,713 B1 | 3/2003 | Yamazaki |
| 6,559,594 B2 | 5/2003 | Fukunaga et al. |
| 6,573,195 B1 | 6/2003 | Yamazaki et al. |
| 6,573,584 B1 | 6/2003 | Nagakari et al. |
| 6,576,926 B1 | 6/2003 | Yamazaki et al. |
| 6,577,302 B2 | 6/2003 | Hunter |
| 6,580,408 B1 | 6/2003 | Bae et al. |
| 6,580,657 B2 | 6/2003 | Sanford et al. |
| 6,583,775 B1 | 6/2003 | Sekiya et al. |
| 6,583,776 B2 | 6/2003 | Yamazaki et al. |
| 6,587,086 B1 | 7/2003 | Koyama |
| 6,593,691 B2 | 7/2003 | Nishi et al. |
| 6,594,606 B2 | 7/2003 | Everitt |
| 6,597,203 B2 | 7/2003 | Forbes |
| 6,611,108 B2 | 8/2003 | Kimura |
| 6,617,644 B1 | 9/2003 | Yamazaki et al. |
| 6,618,030 B2 | 9/2003 | Kane et al. |
| 6,641,933 B1 | 11/2003 | Yamazaki et al. |
| 6,661,180 B2 | 12/2003 | Koyama |
| 6,661,397 B2 | 12/2003 | Mikami et al. |
| 6,670,637 B2 | 12/2003 | Yamazaki et al. |
| 6,677,713 B1 | 1/2004 | Sung |
| 6,680,577 B1 | 1/2004 | Inukai et al. |
| 6,687,266 B1 | 2/2004 | Ma et al. |
| 6,690,344 B1 | 2/2004 | Takeuchi et al. |
| 6,693,388 B2 | 2/2004 | Oomura |
| 6,693,610 B2 | 2/2004 | Shannon et al. |
| 6,697,057 B2 | 2/2004 | Koyama et al. |
| 6,720,942 B2 | 4/2004 | Lee et al. |
| 6,734,636 B2 | 5/2004 | Sanford et al. |
| 6,738,034 B2 | 5/2004 | Kaneko et al. |
| 6,738,035 B1 | 5/2004 | Fan |
| 6,771,028 B1 | 8/2004 | Winters |
| 6,777,712 B2 | 8/2004 | Sanford et al. |
| 6,780,687 B2 | 8/2004 | Nakajima et al. |
| 6,806,638 B2 | 10/2004 | Lih et al. |
| 6,806,857 B2 | 10/2004 | Sempel et al. |
| 6,809,706 B2 | 10/2004 | Shimoda |
| 6,859,193 B1 | 2/2005 | Yumoto |
| 6,861,670 B1 | 3/2005 | Ohtani et al. |
| 6,873,117 B2 | 3/2005 | Ishizuka |
| 6,873,320 B2 | 3/2005 | Nakamura |
| 6,878,968 B1 | 4/2005 | Ohnuma |
| 6,909,114 B1 | 6/2005 | Yamazaki |
| 6,909,419 B2 | 6/2005 | Zavracky et al. |
| 6,919,871 B2 | 7/2005 | Kwon |
| 6,937,215 B2 | 8/2005 | Lo |
| 6,940,214 B1 | 9/2005 | Komiya et al. |
| 6,943,500 B2 | 9/2005 | LeChevalier |
| 6,954,194 B2 | 10/2005 | Matsumoto et al. |
| 6,956,547 B2 | 10/2005 | Bae et al. |
| 6,995,510 B2 | 2/2006 | Murakami et al. |
| 6,995,519 B2 | 2/2006 | Arnold et al. |
| 7,022,556 B1 | 4/2006 | Adachi |
| 7,023,408 B2 | 4/2006 | Chen et al. |

(56) References Cited

U.S. PATENT DOCUMENTS

| | | | |
|---|---|---|---|
| 7,027,015 B2 | 4/2006 | Booth, Jr. et al. |
| 7,034,793 B2 | 4/2006 | Sekiya et al. |
| 7,088,051 B1 | 8/2006 | Cok |
| 7,106,285 B2 | 9/2006 | Naugler |
| 7,116,058 B2 | 10/2006 | Lo et al. |
| 7,129,914 B2 | 10/2006 | Knapp et al. |
| 7,129,917 B2 | 10/2006 | Yamazaki et al. |
| 7,141,821 B1 | 11/2006 | Yamazaki et al. |
| 7,161,566 B2 | 1/2007 | Cok et al. |
| 7,193,589 B2 | 3/2007 | Yoshida et al. |
| 7,199,516 B2 | 4/2007 | Seo et al. |
| 7,220,997 B2 | 5/2007 | Nakata |
| 7,235,810 B1 | 6/2007 | Yamazaki et al. |
| 7,245,277 B2 | 7/2007 | Ishizuka |
| 7,248,236 B2 | 7/2007 | Nathan et al. |
| 7,264,979 B2 | 9/2007 | Yamagata et al. |
| 7,274,345 B2 | 9/2007 | Imamura et al. |
| 7,274,363 B2 | 9/2007 | Ishizuka et al. |
| 7,279,711 B1 | 10/2007 | Yamazaki et al. |
| 7,304,621 B2 | 12/2007 | Oomori et al. |
| 7,310,092 B2 | 12/2007 | Imamura |
| 7,315,295 B2 | 1/2008 | Kimura |
| 7,317,429 B2 | 1/2008 | Shirasaki et al. |
| 7,319,465 B2 | 1/2008 | Mikami et al. |
| 7,321,348 B2 | 1/2008 | Cok et al. |
| 7,339,636 B2 | 3/2008 | Voloschenko et al. |
| 7,355,574 B1 | 4/2008 | Leon et al. |
| 7,358,941 B2 | 4/2008 | Ono et al. |
| 7,402,467 B1 | 7/2008 | Kadono et al. |
| 7,414,600 B2 | 8/2008 | Nathan et al. |
| 7,432,885 B2 | 10/2008 | Asano et al. |
| 7,474,285 B2 | 1/2009 | Kimura |
| 7,485,478 B2 | 2/2009 | Yamagata et al. |
| 7,502,000 B2 | 3/2009 | Yuki et al. |
| 7,535,449 B2 | 5/2009 | Miyazawa |
| 7,554,512 B2 | 6/2009 | Steer |
| 7,569,849 B2 | 8/2009 | Nathan et al. |
| 7,619,594 B2 | 11/2009 | Hu |
| 7,619,597 B2 | 11/2009 | Nathan et al. |
| 7,697,052 B1 | 4/2010 | Yamazaki et al. |
| 7,825,419 B2 | 11/2010 | Yamagata et al. |
| 7,859,492 B2 | 12/2010 | Kohno |
| 7,868,857 B2 * | 1/2011 | Nathan ............... G09G 3/3241 345/690 |
| 7,868,859 B2 | 1/2011 | Tomida et al. |
| 7,876,294 B2 | 1/2011 | Sasaki et al. |
| 7,948,170 B2 | 5/2011 | Striakhilev et al. |
| 7,969,390 B2 | 6/2011 | Yoshida |
| 7,995,010 B2 | 8/2011 | Yamazaki et al. |
| 8,044,893 B2 | 10/2011 | Nathan et al. |
| 8,115,707 B2 | 2/2012 | Nathan et al. |
| 8,378,362 B2 | 2/2013 | Heo et al. |
| 8,493,295 B2 | 7/2013 | Yamazaki et al. |
| 8,497,525 B2 | 7/2013 | Yamagata et al. |
| 9,001,097 B2 * | 4/2015 | Al-Dahle ............... G09G 3/006 345/207 |
| 9,385,169 B2 | 7/2016 | Chaji et al. |
| 9,606,607 B2 | 3/2017 | Chaji |
| 9,633,597 B2 | 4/2017 | Nathan et al. |
| 9,728,135 B2 | 8/2017 | Nathan et al. |
| 9,741,292 B2 | 8/2017 | Nathan et al. |
| 10,049,643 B1 * | 8/2018 | Wu ................... G09G 5/026 |
| 2001/0002703 A1 | 6/2001 | Koyama |
| 2001/0004190 A1 | 6/2001 | Nishi et al. |
| 2001/0013806 A1 | 8/2001 | Notani |
| 2001/0015653 A1 | 8/2001 | De Jong et al. |
| 2001/0020926 A1 | 9/2001 | Kujik |
| 2001/0024186 A1 | 9/2001 | Kane |
| 2001/0026127 A1 | 10/2001 | Yoneda et al. |
| 2001/0026179 A1 | 10/2001 | Saeki |
| 2001/0026257 A1 | 10/2001 | Kimura |
| 2001/0030323 A1 | 10/2001 | Ikeda |
| 2001/0033199 A1 | 10/2001 | Aoki |
| 2001/0038098 A1 | 11/2001 | Yamazaki et al. |
| 2001/0043173 A1 | 11/2001 | Troutman |
| 2001/0045929 A1 | 11/2001 | Prache et al. |
| 2001/0052006 A1 | 12/2001 | Sempel et al. |
| 2001/0052898 A1 | 12/2001 | Osame et al. |
| 2002/0000576 A1 | 1/2002 | Inukai |
| 2002/0011796 A1 | 1/2002 | Koyama |
| 2002/0011799 A1 | 1/2002 | Kimura |
| 2002/0011981 A1 | 1/2002 | Kujik |
| 2002/0015031 A1 | 2/2002 | Fujita et al. |
| 2002/0015032 A1 | 2/2002 | Koyama et al. |
| 2002/0030528 A1 | 3/2002 | Matsumoto et al. |
| 2002/0030647 A1 | 3/2002 | Hack et al. |
| 2002/0036463 A1 | 3/2002 | Yoneda et al. |
| 2002/0047852 A1 | 4/2002 | Inukai et al. |
| 2002/0048829 A1 | 4/2002 | Yamazaki et al. |
| 2002/0050795 A1 | 5/2002 | Imura |
| 2002/0053401 A1 | 5/2002 | Ishikawa et al. |
| 2002/0070909 A1 | 6/2002 | Asano et al. |
| 2002/0080108 A1 | 6/2002 | Wang |
| 2002/0084463 A1 | 7/2002 | Sanford et al. |
| 2002/0101172 A1 | 8/2002 | Bu |
| 2002/0101433 A1 | 8/2002 | McKnight |
| 2002/0113248 A1 | 8/2002 | Yamagata et al. |
| 2002/0122308 A1 | 9/2002 | Ikeda |
| 2002/0130686 A1 | 9/2002 | Forbes |
| 2002/0154084 A1 | 10/2002 | Tanaka et al. |
| 2002/0158823 A1 | 10/2002 | Zavracky et al. |
| 2002/0163314 A1 | 11/2002 | Yamazaki et al. |
| 2002/0167471 A1 | 11/2002 | Everitt |
| 2002/0180369 A1 | 12/2002 | Koyama |
| 2002/0180721 A1 | 12/2002 | Kimura et al. |
| 2002/0186214 A1 | 12/2002 | Siwinski |
| 2002/0190332 A1 | 12/2002 | Lee et al. |
| 2002/0190924 A1 | 12/2002 | Asano et al. |
| 2002/0190971 A1 | 12/2002 | Nakamura et al. |
| 2002/0195967 A1 | 12/2002 | Kim et al. |
| 2002/0195968 A1 | 12/2002 | Sanford et al. |
| 2003/0020413 A1 | 1/2003 | Oomura |
| 2003/0030603 A1 | 2/2003 | Shimoda |
| 2003/0062524 A1 | 4/2003 | Kimura |
| 2003/0063081 A1 | 4/2003 | Kimura et al. |
| 2003/0071804 A1 | 4/2003 | Yamazaki et al. |
| 2003/0071821 A1 | 4/2003 | Sundahl |
| 2003/0076048 A1 | 4/2003 | Rutherford |
| 2003/0090445 A1 | 5/2003 | Chen et al. |
| 2003/0090447 A1 | 5/2003 | Kimura |
| 2003/0090481 A1 | 5/2003 | Kimura |
| 2003/0095087 A1 | 5/2003 | Libsch |
| 2003/0107560 A1 | 6/2003 | Yumoto et al. |
| 2003/0111966 A1 | 6/2003 | Mikami et al. |
| 2003/0122745 A1 | 7/2003 | Miyazawa |
| 2003/0140958 A1 | 7/2003 | Yang et al. |
| 2003/0151569 A1 | 8/2003 | Lee et al. |
| 2003/0169219 A1 | 9/2003 | LeChevalier |
| 2003/0174152 A1 | 9/2003 | Noguchi |
| 2003/0178617 A1 | 9/2003 | Appenzeller et al. |
| 2003/0179626 A1 | 9/2003 | Sanford et al. |
| 2003/0197663 A1 | 10/2003 | Lee et al. |
| 2003/0206060 A1 | 11/2003 | Suzuki |
| 2003/0230980 A1 | 12/2003 | Forrest et al. |
| 2004/0027063 A1 | 2/2004 | Nishikawa |
| 2004/0056604 A1 | 3/2004 | Shih et al. |
| 2004/0066357 A1 | 4/2004 | Kawasaki |
| 2004/0070557 A1 | 4/2004 | Asano et al. |
| 2004/0080262 A1 | 4/2004 | Park et al. |
| 2004/0080470 A1 | 4/2004 | Yamazaki et al. |
| 2004/0090400 A1 | 5/2004 | Yoo |
| 2004/0108518 A1 | 6/2004 | Jo |
| 2004/0113903 A1 | 6/2004 | Mikami et al. |
| 2004/0129933 A1 | 7/2004 | Nathan et al. |
| 2004/0130516 A1 | 7/2004 | Nathan et al. |
| 2004/0135749 A1 | 7/2004 | Kondakov et al. |
| 2004/0145547 A1 | 7/2004 | Oh |
| 2004/0150592 A1 | 8/2004 | Mizukoshi et al. |
| 2004/0150594 A1 | 8/2004 | Koyama et al. |
| 2004/0150595 A1 | 8/2004 | Kasai |
| 2004/0155841 A1 | 8/2004 | Kasai |
| 2004/0174347 A1 | 9/2004 | Sun et al. |
| 2004/0174349 A1 | 9/2004 | Libsch |
| 2004/0183759 A1 | 9/2004 | Stevenson et al. |

(56) References Cited

U.S. PATENT DOCUMENTS

| | | | |
|---|---|---|---|
| 2004/0189627 A1 | 9/2004 | Shirasaki et al. | |
| 2004/0196275 A1 | 10/2004 | Hattori | |
| 2004/0201554 A1 | 10/2004 | Satoh | |
| 2004/0207615 A1 | 10/2004 | Yumoto | |
| 2004/0233125 A1 | 11/2004 | Tanghe et al. | |
| 2004/0239596 A1 | 12/2004 | Ono et al. | |
| 2004/0252089 A1 | 12/2004 | Ono et al. | |
| 2004/0257355 A1 | 12/2004 | Naugler | |
| 2004/0263437 A1 | 12/2004 | Hattori | |
| 2005/0007357 A1 | 1/2005 | Yamashita et al. | |
| 2005/0030267 A1 | 2/2005 | Tanghe et al. | |
| 2005/0035709 A1 | 2/2005 | Furuie et al. | |
| 2005/0067970 A1 | 3/2005 | Libsch et al. | |
| 2005/0067971 A1 | 3/2005 | Kane | |
| 2005/0068270 A1 | 3/2005 | Awakura | |
| 2005/0088085 A1 | 4/2005 | Nishikawa et al. | |
| 2005/0088103 A1 | 4/2005 | Kageyama et al. | |
| 2005/0110420 A1 | 5/2005 | Arnold et al. | |
| 2005/0117096 A1 | 6/2005 | Voloschenko et al. | |
| 2005/0134526 A1* | 6/2005 | Willem | G06F 3/1446 345/1.3 |
| 2005/0140598 A1 | 6/2005 | Kim et al. | |
| 2005/0140610 A1 | 6/2005 | Smith et al. | |
| 2005/0145891 A1 | 7/2005 | Abe | |
| 2005/0156831 A1 | 7/2005 | Yamazaki et al. | |
| 2005/0168416 A1 | 8/2005 | Hashimoto et al. | |
| 2005/0206590 A1 | 9/2005 | Sasaki et al. | |
| 2005/0225686 A1 | 10/2005 | Brummack et al. | |
| 2005/0260777 A1 | 11/2005 | Brabec et al. | |
| 2005/0264149 A1* | 12/2005 | Cok | G01J 1/4228 313/110 |
| 2005/0269959 A1 | 12/2005 | Uchino et al. | |
| 2005/0269960 A1 | 12/2005 | Ono et al. | |
| 2005/0285822 A1 | 12/2005 | Reddy et al. | |
| 2005/0285825 A1 | 12/2005 | Eom et al. | |
| 2006/0007072 A1 | 1/2006 | Choi et al. | |
| 2006/0012310 A1 | 1/2006 | Chen et al. | |
| 2006/0017669 A1* | 1/2006 | Cok | G09G 3/3216 345/77 |
| 2006/0027807 A1 | 2/2006 | Nathan et al. | |
| 2006/0030084 A1 | 2/2006 | Young | |
| 2006/0038758 A1 | 2/2006 | Routley et al. | |
| 2006/0044227 A1 | 3/2006 | Hadcock | |
| 2006/0061248 A1* | 3/2006 | Cok | G09G 3/3208 313/110 |
| 2006/0066527 A1 | 3/2006 | Chou | |
| 2006/0077135 A1* | 4/2006 | Cok | G09G 3/3216 345/76 |
| 2006/0092185 A1 | 5/2006 | Jo et al. | |
| 2006/0221326 A1* | 10/2006 | Cok | G09G 3/3208 356/121 |
| 2006/0232522 A1 | 10/2006 | Roy et al. | |
| 2006/0261841 A1 | 11/2006 | Fish | |
| 2006/0264143 A1 | 11/2006 | Lee et al. | |
| 2006/0273997 A1 | 12/2006 | Nathan et al. | |
| 2006/0284801 A1 | 12/2006 | Yoon et al. | |
| 2006/0284895 A1* | 12/2006 | Marcu | G09G 3/20 345/690 |
| 2007/0001937 A1 | 1/2007 | Park et al. | |
| 2007/0001939 A1 | 1/2007 | Hashimoto et al. | |
| 2007/0008268 A1 | 1/2007 | Park et al. | |
| 2007/0008297 A1 | 1/2007 | Bassetti | |
| 2007/0046195 A1 | 3/2007 | Chin et al. | |
| 2007/0069998 A1 | 3/2007 | Naugler et al. | |
| 2007/0080905 A1 | 4/2007 | Takahara | |
| 2007/0080906 A1 | 4/2007 | Tanabe | |
| 2007/0080908 A1 | 4/2007 | Nathan et al. | |
| 2007/0080918 A1 | 4/2007 | Kawachi et al. | |
| 2007/0103419 A1 | 5/2007 | Uchino et al. | |
| 2007/0132790 A1* | 6/2007 | Miller | G09G 5/06 345/690 |
| 2007/0182671 A1 | 8/2007 | Nathan et al. | |
| 2007/0273294 A1 | 11/2007 | Nagayama | |
| 2007/0285359 A1 | 12/2007 | Ono | |
| 2007/0290958 A1* | 12/2007 | Cok | G09G 3/3225 345/77 |
| 2007/0296672 A1 | 12/2007 | Kim et al. | |
| 2008/0042943 A1* | 2/2008 | Cok | G09G 3/3225 345/77 |
| 2008/0042948 A1 | 2/2008 | Yamashita et al. | |
| 2008/0055209 A1* | 3/2008 | Cok | G09G 3/006 345/77 |
| 2008/0074413 A1 | 3/2008 | Ogura | |
| 2008/0088549 A1 | 4/2008 | Nathan et al. | |
| 2008/0122803 A1 | 5/2008 | Izadi et al. | |
| 2008/0230118 A1 | 9/2008 | Nakatani et al. | |
| 2009/0032807 A1 | 2/2009 | Shinohara et al. | |
| 2009/0051283 A1 | 2/2009 | Cok et al. | |
| 2009/0160743 A1 | 6/2009 | Tomida et al. | |
| 2009/0162961 A1 | 6/2009 | Deane | |
| 2009/0174628 A1 | 7/2009 | Wang et al. | |
| 2009/0213046 A1 | 8/2009 | Nam | |
| 2010/0052524 A1 | 3/2010 | Kinoshita | |
| 2010/0078230 A1 | 4/2010 | Rosenblatt et al. | |
| 2010/0079711 A1 | 4/2010 | Tanaka | |
| 2010/0097335 A1 | 4/2010 | Jung et al. | |
| 2010/0133994 A1 | 6/2010 | Song et al. | |
| 2010/0134456 A1 | 6/2010 | Oyamada | |
| 2010/0140600 A1 | 6/2010 | Clough et al. | |
| 2010/0156279 A1 | 6/2010 | Tamura et al. | |
| 2010/0237374 A1 | 9/2010 | Chu et al. | |
| 2010/0328294 A1 | 12/2010 | Sasaki et al. | |
| 2011/0090210 A1 | 4/2011 | Sasaki et al. | |
| 2011/0133636 A1 | 6/2011 | Matsuo et al. | |
| 2011/0180825 A1 | 7/2011 | Lee et al. | |
| 2012/0105507 A1* | 5/2012 | An | G09G 3/3426 345/690 |
| 2012/0147025 A1* | 6/2012 | Pyo | H04N 5/57 345/581 |
| 2012/0212468 A1 | 8/2012 | Govil | |
| 2013/0009930 A1 | 1/2013 | Cho et al. | |
| 2013/0032831 A1 | 2/2013 | Chaji et al. | |
| 2013/0113785 A1 | 5/2013 | Sumi | |
| 2014/0016005 A1* | 1/2014 | Kishima | H04N 5/367 348/246 |
| 2014/0111567 A1* | 4/2014 | Nathan | G09G 3/3233 345/694 |
| 2014/0232709 A1* | 8/2014 | Dunn | H04N 21/42202 345/207 |
| 2014/0300756 A1* | 10/2014 | Murase | H04N 17/00 348/189 |
| 2015/0116364 A1* | 4/2015 | Aurongzeb | G06F 3/0487 345/659 |
| 2015/0213771 A1* | 7/2015 | Ohnishi | G09G 3/006 345/88 |
| 2016/0171925 A1* | 6/2016 | Hussain | G09G 3/2096 710/12 |
| 2017/0124947 A1* | 5/2017 | Kim | G09G 3/3233 |
| 2017/0287390 A1* | 10/2017 | Lee | G09G 3/325 |

FOREIGN PATENT DOCUMENTS

| | | |
|---|---|---|
| CA | 2 249 592 | 7/1998 |
| CA | 2 368 386 | 9/1999 |
| CA | 2 242 720 | 1/2000 |
| CA | 2 354 018 | 6/2000 |
| CA | 2 436 451 | 8/2002 |
| CA | 2 438 577 | 8/2002 |
| CA | 2 483 645 | 12/2003 |
| CA | 2 463 653 | 1/2004 |
| CA | 2498136 | 3/2004 |
| CA | 2522396 | 11/2004 |
| CA | 2443206 | 3/2005 |
| CA | 2472671 | 12/2005 |
| CA | 2567076 | 1/2006 |
| CA | 2526782 | 4/2006 |
| CN | 1381032 | 11/2002 |
| CN | 1448908 | 10/2003 |
| CN | 1776922 | 5/2006 |
| CN | 101032027 A | 9/2007 |
| DE | 20 2006 00542 | 6/2006 |
| EP | 0 940 796 | 9/1999 |

(56) References Cited

FOREIGN PATENT DOCUMENTS

| | | |
|---|---|---|
| EP | 1 028 471 A | 8/2000 |
| EP | 1 103 947 | 5/2001 |
| EP | 1 130 565 A1 | 9/2001 |
| EP | 1 184 833 | 3/2002 |
| EP | 1 194 013 | 4/2002 |
| EP | 1 310 939 | 5/2003 |
| EP | 1 335 430 A1 | 8/2003 |
| EP | 1 372 136 | 12/2003 |
| EP | 1 381 019 | 1/2004 |
| EP | 1 418 566 | 5/2004 |
| EP | 1 429 312 A | 6/2004 |
| EP | 1 439 520 | 7/2004 |
| EP | 1 465 143 A | 10/2004 |
| EP | 1 467 408 | 10/2004 |
| EP | 1 517 290 | 3/2005 |
| EP | 1 521 203 A2 | 4/2005 |
| EP | 2317499 | 5/2011 |
| GB | 2 205 431 | 12/1988 |
| JP | 09 090405 | 4/1997 |
| JP | 10-153759 | 6/1998 |
| JP | 10-254410 | 9/1998 |
| JP | 11 231805 | 8/1999 |
| JP | 11-282419 | 10/1999 |
| JP | 2000/056847 | 2/2000 |
| JP | 2000-077192 | 3/2000 |
| JP | 2000-089198 | 3/2000 |
| JP | 2000-352941 | 12/2000 |
| JP | 2002-91376 | 3/2002 |
| JP | 2002-268576 | 9/2002 |
| JP | 2002-278513 | 9/2002 |
| JP | 2002-333862 | 11/2002 |
| JP | 2003-022035 | 1/2003 |
| JP | 2003-076331 | 3/2003 |
| JP | 2003-150082 | 5/2003 |
| JP | 2003-177709 | 6/2003 |
| JP | 2003-271095 | 9/2003 |
| JP | 2003-308046 | 10/2003 |
| JP | 2005-057217 | 3/2005 |
| JP | 2006065148 | 3/2006 |
| JP | 2009282158 | 12/2009 |
| TW | 485337 | 5/2002 |
| TW | 502233 | 9/2002 |
| TW | 538650 | 6/2003 |
| TW | 569173 | 1/2004 |
| WO | WO 94/25954 | 11/1994 |
| WO | WO 99/48079 | 9/1999 |
| WO | WO 01/27910 A1 | 4/2001 |
| WO | WO 02/067327 A | 8/2002 |
| WO | WO 03/034389 A | 4/2003 |
| WO | WO 03/063124 | 7/2003 |
| WO | WO 03/077231 | 9/2003 |
| WO | WO 03/105117 | 12/2003 |
| WO | WO 2004/003877 | 1/2004 |
| WO | WO 2004/034364 | 4/2004 |
| WO | WO 2005/022498 | 3/2005 |
| WO | WO 2005/029455 | 3/2005 |
| WO | WO 2005/055185 | 6/2005 |
| WO | WO 2006/053424 | 5/2006 |
| WO | WO 2006/063448 A | 6/2006 |
| WO | WO 2006/137337 | 12/2006 |
| WO | WO 2007/003877 A | 1/2007 |
| WO | WO 2007/079572 | 7/2007 |
| WO | WO 2010/023270 | 3/2010 |

OTHER PUBLICATIONS

Alexander et al.: "Pixel circuits and drive schemes for glass and elastic AMOLED displays"; dated Jul. 2005 (9 pages).
Alexander et al.: "Unique Electrical Measurement Technology for Compensation, Inspection, and Process Diagnostics of AMOLED HDTV"; dated May 2010 (4 pages).
Ashtiani et al.: "AMOLED Pixel Circuit With Electronic Compensation of Luminance Degradation"; dated Mar. 2007 (4 pages).
Chaji et al.: "A Current-Mode Comparator for Digital Calibration of Amorphous Silicon AMOLED Displays"; dated Jul. 2008 (5 pages).
Chaji et al.: "A fast settling current driver based on the CCII for AMOLED displays"; dated Dec. 2009 (6 pages).
Chaji et al.: "A Low-Cost Stable Amorphous Silicon AMOLED Display with Full V~T- and V~O~L~E~D Shift Compensation"; dated May 2007 (4 pages).
Chaji et al.: "A low-power driving scheme for a-Si:H active-matrix organic light-emitting diode displays"; dated Jun. 2005 (4 pages).
Chaji et al.: "A low-power high-performance digital circuit for deep submicron technologies"; dated Jun. 2005 (4 pages).
Chaji et al.: "A novel a-Si:H AMOLED pixel circuit based on short-term stress stability of a-Si:H TFTs"; dated Oct. 2005 (3 pages).
Chaji et al.: "A Novel Driving Scheme and Pixel Circuit for AMOLED Displays"; dated Jun. 2006 (4 pages).
Chaji et al.: "A novel driving scheme for high-resolution large-area a-Si:H AMOLED displays"; dated Aug. 2005 (4 pages).
Chaji et al.: "A Stable Voltage-Programmed Pixel Circuit for a-Si:H AMOLED Displays"; dated Dec. 2006 (12 pages).
Chaji et al.: "A Sub-µA fast-settling current-programmed pixel circuit for AMOLED displays"; dated Sep. 2007.
Chaji et al.: "An Enhanced and Simplified Optical Feedback Pixel Circuit for AMOLED Displays"; dated Oct. 2006.
Chaji et al.: "Compensation technique for DC and transient instability of thin film transistor circuits for large-area devices"; dated Aug. 2008.
Chaji et al.: "Driving scheme for stable operation of 2-TFT a-Si AMOLED pixel"; dated Apr. 2005 (2 pages).
Chaji et al.: "Dynamic-effect compensating technique for stable a-Si:H AMOLED displays"; dated Aug. 2005 (4 pages).
Chaji et al.: "Electrical Compensation of OLED Luminance Degradation"; dated Dec. 2007 (3 pages).
Chaji et al.: "eUTDSP: a design study of a new VLIW-based DSP architecture"; dated My 2003 (4 pages).
Chaji et al.: "Fast and Offset-Leakage Insensitive Current-Mode Line Driver for Active Matrix Displays and Sensors"; dated Feb. 2009 (8 pages).
Chaji et al.: "High Speed Low Power Adder Design With a New Logic Style: Pseudo Dynamic Logic (SDL)"; dated Oct. 2001 (4 pages).
Chaji et al.: "High-precision, fast current source for large-area current-programmed a-Si flat panels"; dated Sep. 2006 (4 pages).
Chaji et al.: "Low-Cost AMOLED Television with Ignis Compensating Technology"; dated May 2008 (4 pages).
Chaji et al.: "Low-Cost Stable a-Si:H AMOLED Display for Portable Applications"; dated Jun. 2006 (4 pages).
Chaji et al.: "Low-Power Low-Cost Voltage-Programmed a-Si:H AMOLED Display"; dated Jun. 2008 (5 pages).
Chaji et al.: "Merged phototransistor pixel with enhanced near infrared response and flicker noise reduction for biomolecular imaging"; dated Nov. 2008 (3 pages).
Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High-Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated 2008 (177 pages).
European Search Report and Written Opinion for Application No. 08 86 5338 dated Nov. 2, 2011 (7 pages).
European Search Report for European Application No. EP 04 78 6661 dated Mar. 9, 2009.
European Search Report for European Application No. EP 05 75 9141 dated Oct. 30, 2009.

(56) References Cited

OTHER PUBLICATIONS

European Search Report for European Application No. EP 05 82 1114 dated Mar. 27, 2009 (2 pages).
European Search Report for European Application No. EP 07 71 9579 dated May 20, 2009.
European Search Report dated Mar. 26, 2012 in corresponding European Patent Application No. 10000421.7 (6 pages).
Extended European Search Report dated Apr. 27, 2011 issued during prosecution of European patent application No. 09733076.5 (13 pages).
Goh et al., "A New a-Si:H Thin Film Transistor Pixel Circul for Active-Matrix Organic Light-Emitting Diodes", IEEE Electron Device Letters, vol. 24, No. 9, Sep. 2003, 4 pages.
International Search Report for International Application No. PCT/CA02/00180 dated Jul. 31, 2002 (3 pages).
International Search Report for International Application No. PCT/CA2004/001741 dated Feb. 21, 2005.
International Search Report for International Application No. PCT/CA2005/001844 dated Mar. 28, 2006 (2 pages).
International Search Report for International Application No. PCT/CA2005/001007 dated Oct. 18, 2005.
International Search Report for International Application No. PCT/CA2007/000652 dated Jul. 25, 2007.
International Search Report for International Application No. PCT/CA2008/002307, dated Apr. 28, 2009 (3 pages).
International Search Report for International Application No. PCT/IB2011/055135, Canadian Patent Office, dated Apr. 16, 2012 (5 pages).
International Search Report dated Jul. 30, 2009 for International Application No. PCT/CA2009/000501 (4 pages).
Jafarabadiashtiani et al.: "A New Driving Method for a-Si AMOLED Displays Based on Voltage Feedback"; dated 2005 (4 pages).
Lee et al.: "Ambipolar Thin-Film Transistors Fabricated by PECVD Nanocrystalline Silicon"; dated 2006 (6 pages).
Ma e y et al: "Organic Light-Emitting Diode/Thin Film Transistor Integration for foldable Displays" Conference record of the 1997 International display research conference and international workshops on LCD technology and emissive technology. Toronto, Sep. 15-19, 1997 (6 pages).
Matsueda y et al.: "35.1: 2.5-in. AMOLED with Integrated 6-bit Gamma Compensated Digital Data Driver"; dated May 2004.
Nathan et al.: "Backplane Requirements for Active Matrix Organic Light Emitting Diode Displays"; dated 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOLED displays"; dated Dec. 2005 (11 pages).
Nathan et al.: "Invited Paper: a -Si for AMOLED—Meeting the Performance and Cost Demands of Display Applications (Cell Phone to HDTV)"; dated 2006 (4 pages).
Nathan et al.: "Thin film imaging technology on glass and plastic" ICM 2000, Proceedings of the 12$^{th}$ International Conference on Microelectronics, (IEEE Cat. No. 00EX453), Tehran Iran; dated Oct. 31-Nov. 2, 2000, pp. 11-14, ISBN: 964-360-057-2, p. 13, col. 1, line 11-48; (4 pages).
Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.

Office Action issued in Chinese Patent Application 200910246264.4 dated Jul. 5, 2013; 8 pages.
Patent Abstracts of Japan, vol. 2000, No. 09, Oct. 13, 2000—JP 2000 172199 A, Jun. 3, 2000, abstract.
Patent Abstracts of Japan, vol. 2002, No. 03, Apr. 3, 2002 (Apr. 4, 2004 & JP 2001 318627 A (Semiconductor EnergyLab DO LTD), Nov. 16, 2001, abstract, paragraphs '01331-01801, paragraph '01691, paragraph '01701, paragraph '01721 and figure 10.
Philipp: "Charge transfer sensing" Sensor Review, vol. 19, No. 2, Dec. 31, 1999 (Dec. 31, 1999), 10 pages.
Rafati et al.: "Comparison of a 17 b multiplier in Dual-rail domino and in Dual-rail D L (D L) logic styles"; dated 2002 (4 pages).
Safavaian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Sanford, James L., et al., "4.2 TFT AMOLED Pixel Circuits and Driving Methods", SID 03 Digest, ISSN/0003, 2003, pp. 10-13.
Stewart M. et al., "Polysilicon TFT technology for active matrix OLED displays" IEEE transactions on electron devices, vol. 48, No. 5; Dated May, 2001 (7 pages).
Tatsuya Sasaoka et al., "24.4L; Late-News Paper: A 13.0-inch AM-OLED Display with Top Emitting Structure and Adaptive Current Mode Programmed Pixel Circuit (TAC)", SID 01 Digest, (2001), pp. 384-387.
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).
Written Opinion dated Jul. 30, 2009 for International Application No. PCT/CA2009/000501 (6 pages).
Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Zhiguo Meng et al; "24.3: Active-Matrix Organic Light-Emitting Diode Display Metal-Induced Unilaterally Crystallized Polycrystalline Silicon Thin-Film implemented Using Transistors", SID 01Digest, (2001), pp. 380-383.
International Search Report for Application No. PCT/IB2014/059409, Canadian Intellectual Property Office, dated Jun. 12, 2014 (4 pages).
Written Opinion for Application No. PCT/IB2014/059409, Canadian Intellectual Property Office, dated Jun. 12, 2014 (5 pages).
Extended European Search Report for Application No. EP 14181848.4, dated Mar. 5, 2015, (9 pages).

* cited by examiner

SYSTEM AND METHOD FOR LOADING IMAGE CORRECTION DATA FOR DISPLAYS

FIELD OF THE INVENTION

The present invention relates to image correction for displays, and in particular to a system and method for loading and saving image correction data for displays.

BACKGROUND OF THE INVENTION

Active-Matrix Organic Light-Emitting Diode (AMO-LED) displays are well known in the art. Polysilicon and metal oxide semiconductor are popular materials used in the AMOLED displays, due to their low cost and well established infrastructure from thin-film transistor liquid crystal display (TFT-LCD) fabrication.

Typically, LED and AMOLED displays require some form of image correction post fabrication. All LED and AMOLED displays, regardless of backplane technology, exhibit differences in luminance on a pixel to pixel basis, primarily as a result of process or construction inequalities, or from aging caused by operational use over time. Luminance non-uniformities in a display may also arise from natural differences in chemistry and performance from the LED and OLED materials themselves. These non-uniformities must be managed by the LED and AMOLED display electronics in order for the display device to attain commercially acceptable levels of performance for mass-market use.

To facilitate image correction, for a given display, the initial non-uniformity correction data is typically acquired optically from the display, at the module level, prior to or after singularization. Other methods, such as electrical measurement or a combination of electrical and optical measurement, may also be used to acquire the correction data. The correction data is then stored on a non-volatile-memory (NVM) chip on the display module itself, as disclosed in U.S. Pat. No. 7,868,857, which is incorporated herein by reference. The extra NVM memory chip adds to the cost of the display module, and consumes valuable power and circuit board surface area.

An object of the present invention is to overcome the shortcomings of the prior art by providing a method of storing and loading the image correction data remote from the display module, thereby eliminating the need for NVM in the product.

SUMMARY OF INVENTION

Accordingly, the present invention relates to a method of loading image correction data for a display system used in a final product comprising:
determining initial correction data for the display system to correct for initial non-uniformity prior to assembly in the final product;
storing the initial correction data in a remote memory separate from the display system and the final product;
assembling the final product including the display system, and a memory store remote from the display system;
downloading the initial correction data from the remote memory and storing the initial correction data in the memory store on the final product; and
transmitting the initial correction data from the memory store to the display system for correcting the display system.

The present invention also relates to a display system for use in a video displaying product, which includes a video source and a memory store including initial correction data for the display system, the display system comprising:
a digital data processor for receiving luminance data in digital form from the video source over a video interface;
a data driver IC for converting the luminance data from digital form to voltage or current form;
a plurality of pixel circuits, each including a thin film transistor (TFT) and an organic light-emitting diode (OLED) for converting the voltage or current into visible light;
a compensation module capable of requesting the initial correction data from the memory store remote from the display system, receiving the initial correction data from the memory store over the video interface; and adjusting the luminance data to correct the display system using the initial correction data.

BRIEF DESCRIPTION OF THE DRAWINGS

The invention will be described in greater detail with reference to the accompanying drawings which represent preferred embodiments thereof, wherein.

DETAILED DESCRIPTION OF THE INVENTIONS

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
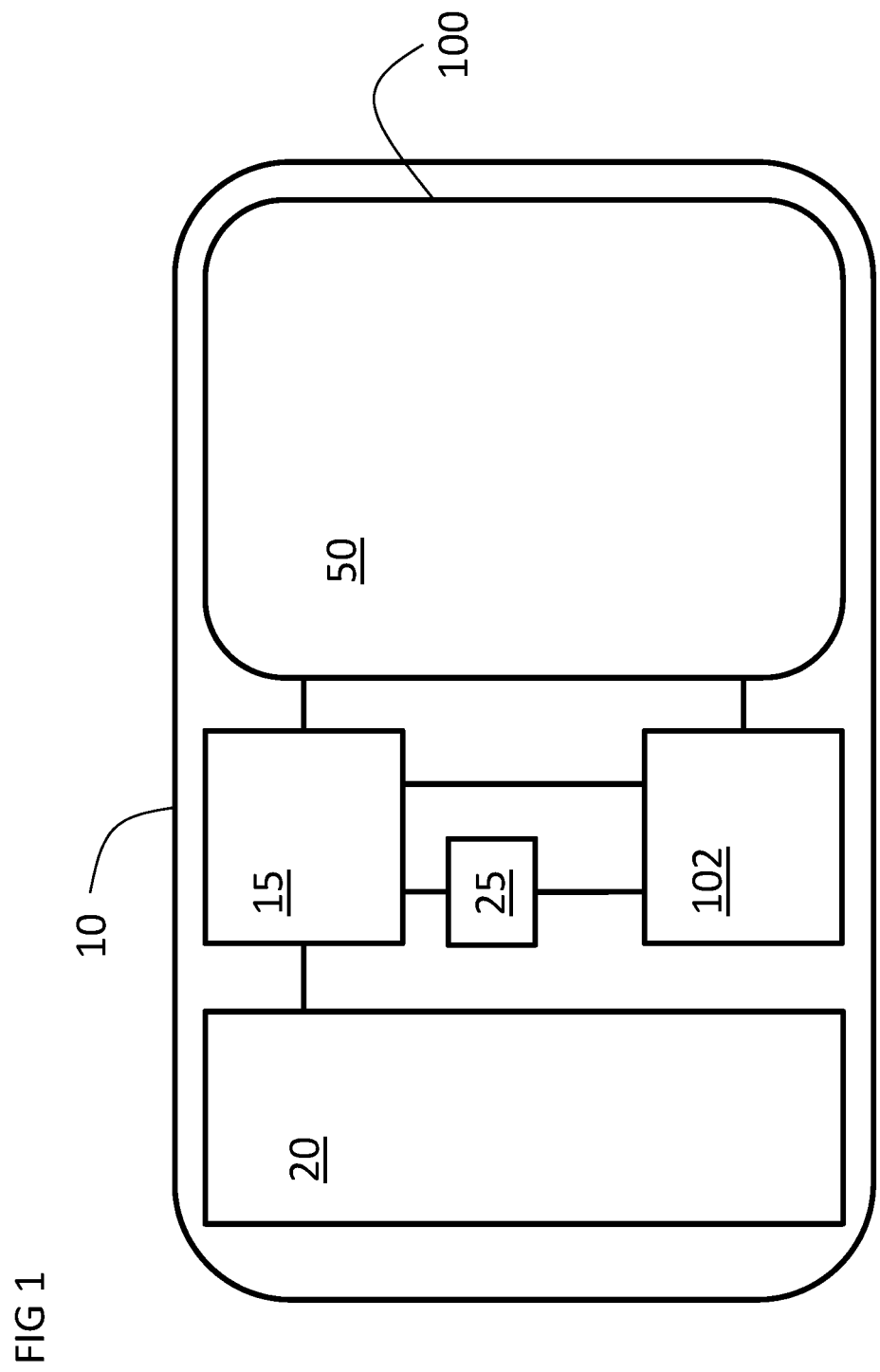
FIG. 1 is a schematic diagram of a final product including the display system in accordance with the present invention.

FIG. 1 illustrates a product or test system 10 in which a light emitting display system 100 of the present invention is installed. The product or test system 10 may include a control processor 15 for controlling the various systems of the product 10, and a user interface 20 for manually inputting instructions to the control processor 15. The user interface 20 may be integrated into the display system 100 or a separate entity. A memory store 25, such as an eMMC flash may be provided for storing control software, application software, and other data of a more personal nature, e.g. photographs, videos etc. A video source 102 is provided for transmitting luminance data to the display system 100 for display 50.

Figure 2:
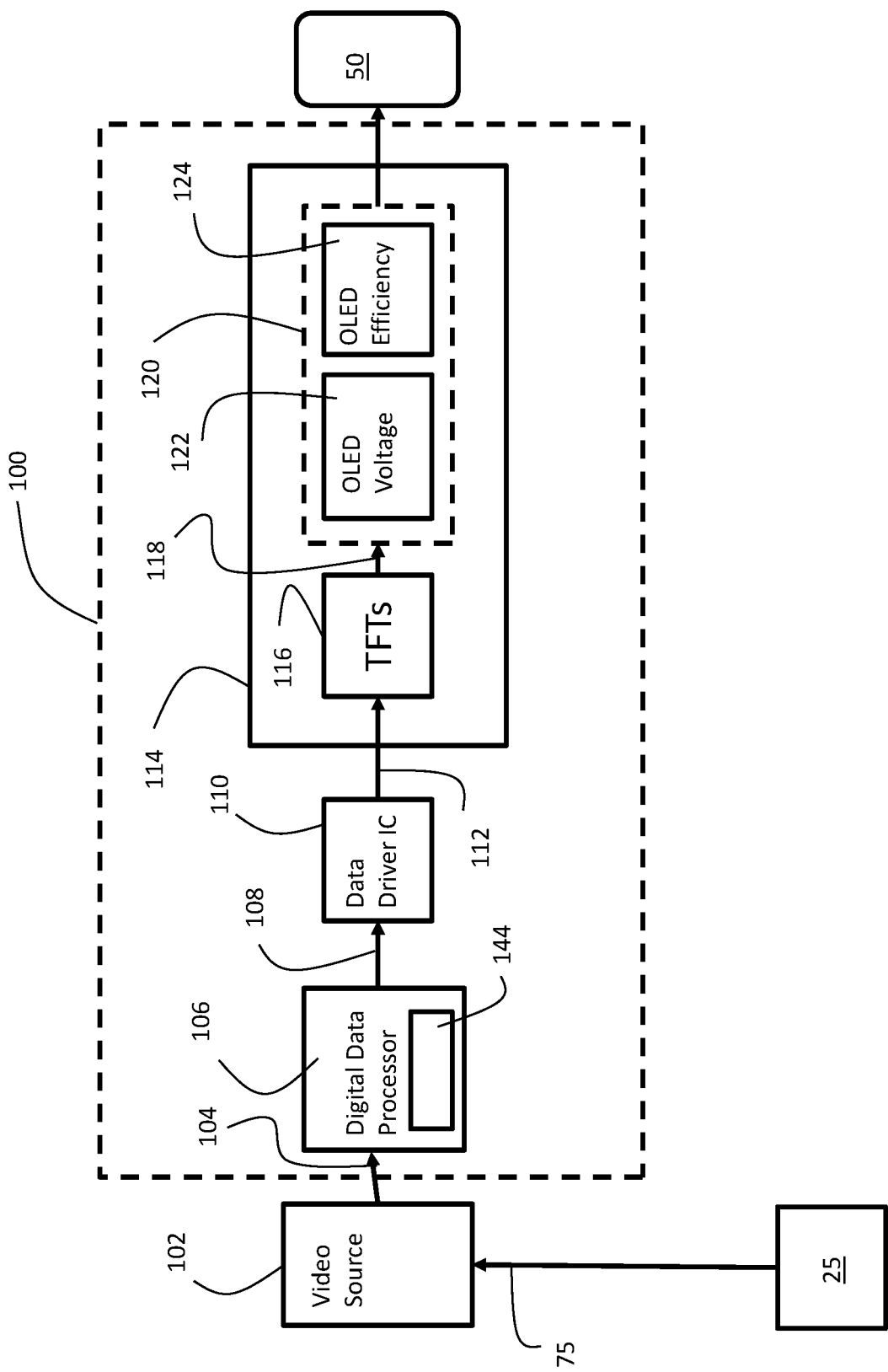
FIG. 2 is a schematic diagram of the display system of FIG. 1.

FIG. 2 illustrates the system and the operation of a light emitting display system 100 to which a compensation scheme in accordance with an embodiment of the present invention is applied. The video source 102 contains or transmits luminance data for each pixel in the display system 100, and sends the luminance data in the form of digital data 104 to a digital data processor 106. The digital data processor 106 may perform some data manipulation functions, such as scaling the resolution or changing the color of the display 100. The digital data processor 106 may include one or more of an application processor system on chip (AP-SOC), a central processing unit (CPU), a graphics processor unit (GPU).

The digital data processor 106 sends digital data 108 to a data driver IC 110. The data driver IC 110 converts the digital data 108 into an analog voltage or current 112. The analog voltage or current 112 is applied to a pixel circuit 114. The pixel circuit 114 includes thin film transistors (TFTs) 116 and a light-emitting diode (LED) or an organic light-emitting diode (OLED), hereinafter referred to as LED 120. The TFTs 116 convert that voltage or current 112 into another current 118 which flows through the LED 120. The LED 120 converts the current 118 into visible light 126. The LED 120 has an LED voltage 122, which is the voltage drop across the LED 120. The LED 120 also has an efficiency 124, which is a ratio of the amount of light emitted to the current through the LED 120. The pixel circuit 114 outputs the visible light 126 based on the analog voltage or current 112 for viewing by the user.

The digital data 104, the analog voltage/current 112, the current 118, and the visible light 126 all contain the exact same information, i.e. luminance data. They are simply different formats of the initial luminance data that came from the video source 102. The desired operation of the system is for a given value of luminance data from the video source 102 to always result in the same value of the visible light 126. In FIG. 2, one pixel circuit 114 is shown as an example; however, the light emitting display system 100 includes a plurality of pixel circuits 114.

However, there are several degradation factors which may cause errors on the visible light 126. Initial differences in luminance on a pixel to pixel basis are primarily as a result of process or construction inequalities. Luminance non-uniformities in a display system 100 may also arise from natural differences in chemistry and performance from the LED and OLED materials themselves. Moreover, with continued usage, the TFTs 116 will output lower current 118 for the same input from the data driver IC 110. With continued usage, the LED 120 will consume greater voltage 122 for the same input current 118. Because the TFTs 116 are not perfect current sources, this will actually reduce the input current 118 slightly. With continued usage, the LED 120 will lose efficiency 124, and emit less visible light 126 for the same input current 118.

Due to these degradation factors, the visible light output 126 will be less over time, even with the same luminance data being sent from the video source 102. Depending on the usage of the display, different pixels may have different amounts of degradation. Therefore, there will be an ever-increasing error between the required brightness of some pixels as specified by the luminance data in the video source 102, and the actual brightness of the pixels. The result is that the desired image will not show properly on the display 50.

Initial Non-Uniformity

Figure 3:
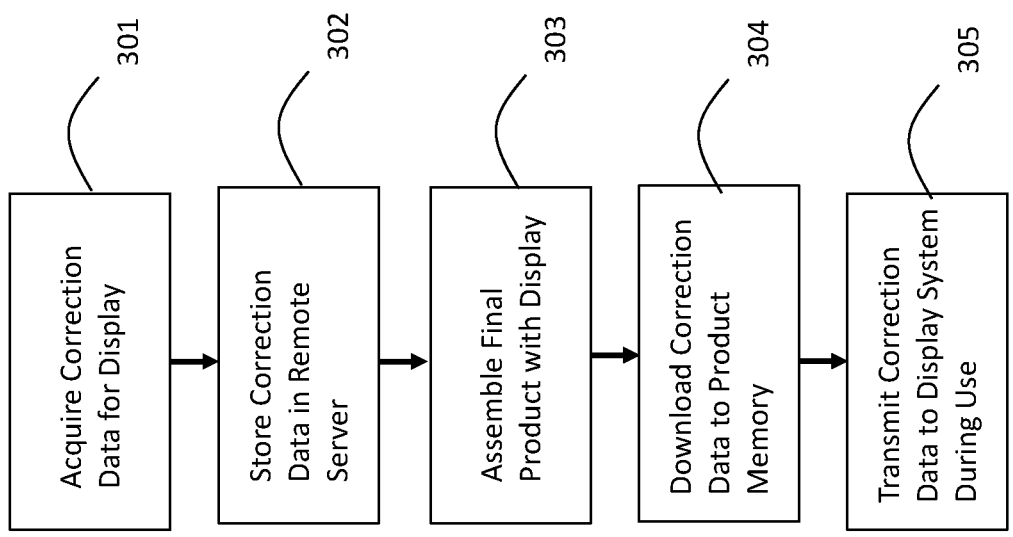
FIG. 3 is a flow chart of the method of the present invention.

With reference to FIG. 3, to facilitate image correction for the display system 100, initial non-uniformity correction data 75 is acquired during initial assembly or manufacture of the display system 100 (Step 301). The correction data 75 is typically acquired optically from the display, at the module level, prior to or after singularization of the pixels 114. Other methods, such as electrical measurement or a combination of electrical and optical measurement, may also be used to acquire the correction data 75.

In order to remove the need for a separate NVM memory in the display system 100, the producer of the display system 100 may serialize the display system 100 and store the correction data in a network-connected or cloud server, i.e. remote from display system 100 and final product 10 (Step 302). When the display system 100 is integrated into the final product or the test system 10 (Step 303) the integrator may pull the correction data 75 from the network connector or cloud server and store onto the memory store 25 of the final product or test system 10 (Step 304). Typically, the final product 10 will have a large and relatively low-cost memory store 10, i.e. in terms of $/bit, available, such as an eMMC flash.

On power-on, a software driver running on the final product or test system 10 can load the correction data 75 from the large, low-cost memory store 25 and populate a correction data table inside of a compensation module 144 in the digital data processor 106, the display driver IC 110 or a discrete processing chip in the display system 100 using the same high speed video interface used for video data from the video source 102 (Step 305). The correction data 75 may be used by the compensation module 144 as part of the application processor, the GPU or the CPU of the digital data processor 106 or by the discrete compensation processing chip to correct the luminance data in its digital form 104 or 108. Alternatively, the compensation module 144 may be part of the display driver IC 110, and use the luminance data in digital form 108 or voltage or current form 112. The high speed video interface transfer speeds available between the video source 102 of the final product 10 and the digital data processor 106/display driver 110 enable fast correction data table loading. The correction data 75 and the luminance data 104 may be transmitted simultaneously over the video interface or the correction data 75 may be transmitted as part of the luminance data 104 over the video interface.

Besides the table upload speed, the final product 10 would not require any flash memory on the display module 100 as the memory store 25 of the final product 10 could be leveraged thus saving cost as well.

The initial non-uniformity correction data 75 may be stored in the memory 25 as an integer value. The location of each integer in the memory 25 is related to the pixel's location on the LED or AMOLED display 50. The value of each integer is a number, which is added to the digital luminance data 104 by the compensation module 144 to compensate for the initial non-uniformity.

For example, digital luminance data may be represented to use 8-bits (256 values) for the brightness of a pixel. A value of 256 may represent maximum luminance for the pixel 114. A value of 128 may represent approximately 50% luminance. The value in the compensation table of the memory 25 may be the number that is added to the luminance data 104 to compensate for the non-uniformity. Therefore, the compensation module 144 in the digital data processor 106 may be implemented by a digital adder. It is noted that digital luminance data 104 may be represented by any number of bits, depending on the driver IC 110 used, for example, 6-bit, 8-bit, 10-bit, 14-bit, etc.

Degradation

Figure 4:
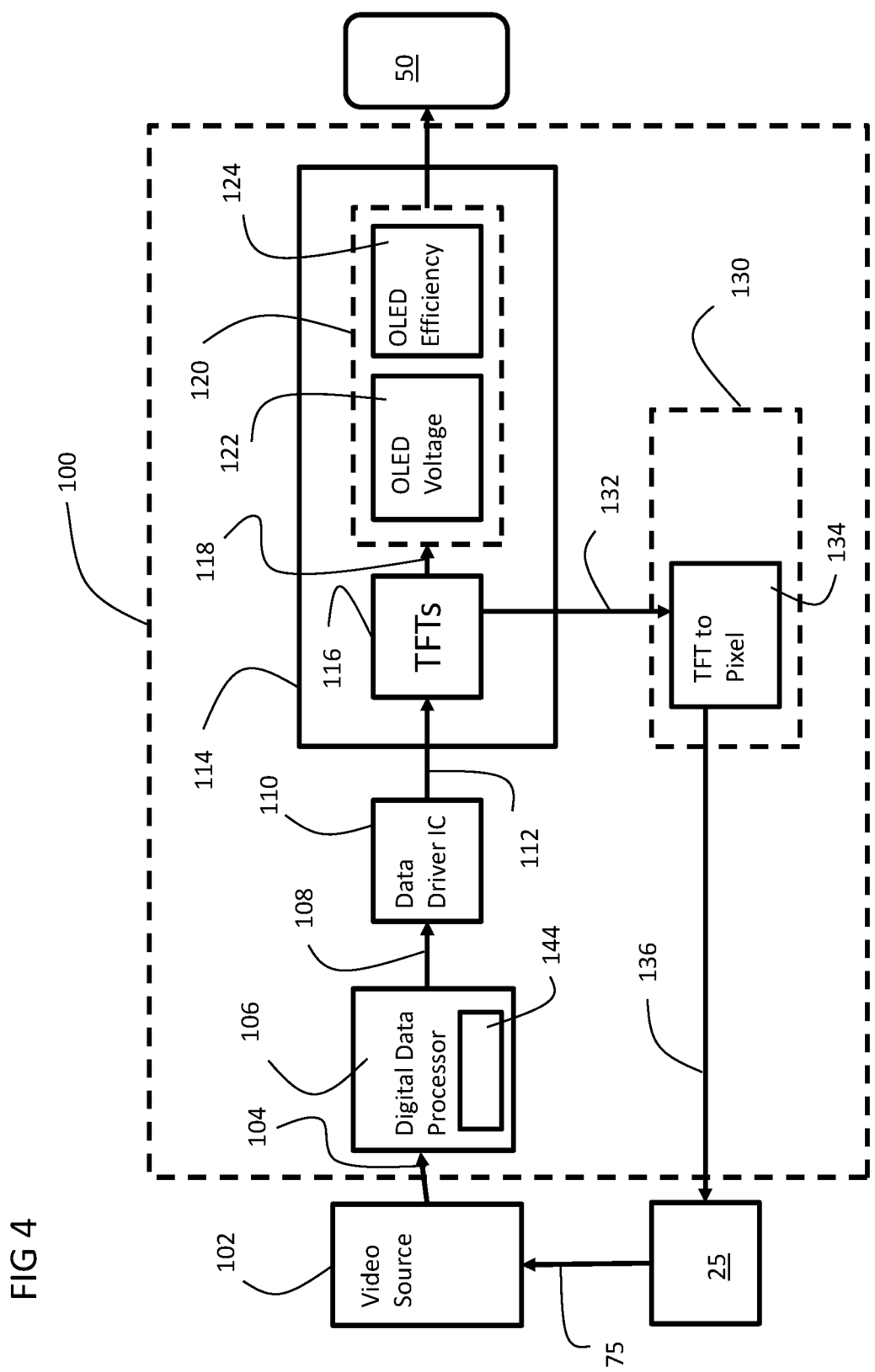
FIG. 4 is a schematic diagram of an alternate embodiment of the display system of FIG. 1.

With reference to FIG. 4, to help mitigate the degradation over time and update the initial non-uniformity correction data 75 to become compensation data 136, a compensation functions module 130 is provided with the display 50. The compensation functions module 130 includes a module 134 for implementing an algorithm, referred to as TFT-to-pixel circuit conversion algorithm, based on degradation data 132 from the pixel circuit 114. The degradation data 132 may be measured TFT degradation data or measured TFT and LED degradation data. The module 134 outputs calculated pixel circuit degradation (compensation) data 136 to the digital data processor 106.

The degradation data 132 is electrical data which represents how much a part of the pixel circuit 114 has been degraded. The data measured from the pixel circuit 114 may represent, for example, one or more characteristics of a part of the pixel circuit 114.

The degradation data 132 is measured from, for example, one or more thin-film-transistors (TFTs), an light emitting diode (LED), an organic light emitting diode (OLED), or a combination thereof. It is noted that the transistors of the pixel circuit 114 is not limited to the TFTs, and the light emitting device of the pixel circuit 114 is not limited to the OLED. The measured degradation data 132 may be digital or analog data. The display system 100 provides compensation data 136 based on measurement from a part of the pixel circuit 114, e.g. TFT 116 or LED 120, to compensate for non-uniformities in the display 50. The non-uniformities may include brightness non-uniformity, color non-uniformity, or a combination thereof. Factors for causing such non-uniformities may include, but not limited to, process or construction inequalities in the display, aging of pixel circuits, etc.

The degradation data 132 may be measured initially during manufacture or assembly, at a regular time interval, e.g. daily, weekly or monthly, or at a dynamically regulated time interval, e.g. upon request of user. The calculated pixel circuit degradation data 136 may be compensation data to correct non-uniformities in the display 50. The calculated pixel circuit degradation (compensation) data 136 may include any parameter to produce compensation. The compensation data 136 may be used at a regular time interval, e.g. each frame, regular interval, etc., or at a dynamically regulated timing. The measured degradation data 132, the compensation data 136 or a combination thereof may be stored in the memory store 25.

The TFT-to-pixel circuit conversion algorithm module 134 or the combination of the TFT-to-pixel circuit conversion algorithm module 134 and the digital data processor 106 estimates the degradation of the entire pixel circuit 114 based on the measured degradation data 132. Based on this estimation, the entire degradation of the pixel circuit 114 is compensated by adjusting, at the digital data processor 106, the luminance data (digital data 104) applied to a certain pixel circuit(s).

The display system 100 may modify or adjust the luminance data 104 applied to a degraded pixel circuit 114 or non-degraded pixel circuit 114. For example, if a constant value of visible light 126 is desired, the digital data processor 106 increases the luminance data for a pixel that is highly degraded, thereby compensating for the degradation.

In FIG. 4, the TFT-to-pixel circuit conversion algorithm module 134 is provided separately from the digital data processor 106. However, the TFT-to-pixel circuit conversion algorithm module 134 may be integrated into the digital data processor 106.

The system 100 of FIG. 4 measures the degradation of the TFTs 116 only. The degradation of the TFTs 116 and the LED 120 are usage-dependent, and the TFTs 116 and the LED 120 are always linked in the pixel circuit 114. Whenever the TFT 116 is stressed, the LED 120 is also stressed. Therefore, there is a predictable relationship between the degradation of the TFTs 116, and the degradation of the pixel circuit 114 as a whole. The TFT-to-pixel circuit conversion algorithm module 134 or the combination of the TFT-to-pixel circuit conversion algorithm module 134 and the digital data processor 106 estimates the degradation of the entire pixel circuit 114 based on the TFT degradation only. The embodiment of the present invention may also be applied to systems that monitor both TFT and LED degradation independently.

The pixel circuit 114 has a component that can be measured. The measurement obtained from the pixel circuit 114 is in some way related to the pixel circuit's degradation.

Figure 5:
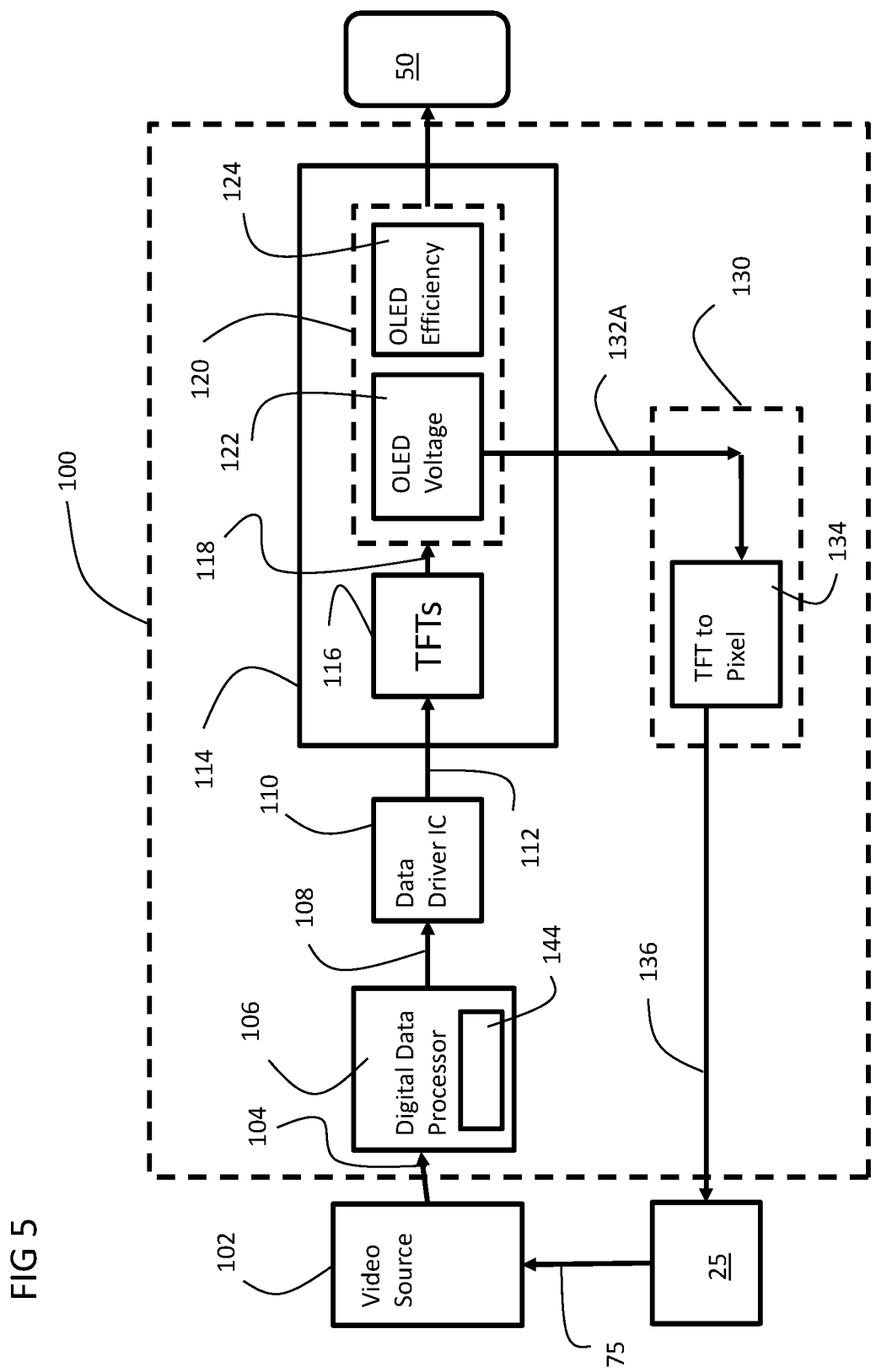
FIG. 5 is a schematic diagram of an alternate embodiment of the display system of FIG. 1.

FIG. 5 illustrates a further example of the system 100 of FIG. 4. The system 100 of FIG. 5 measures the LED voltage 122. Thus, the measured degradation data 132A is related to the TFT 116 and the LED 120 degradation. The compensation functions module 130 of FIG. 3 implements the TFT-to-pixel circuit conversion algorithm 134 on the signal related to both the TFT degradation and LED degradation. The TFT-to-pixel circuit conversion algorithm module 134 or the combination of the TFT-to-pixel circuit conversion algorithm module 134 and the digital data processor 106 estimates the degradation of the entire pixel circuit 114 based on the TFT degradation and the LED degradation. The TFT degradation and LED degradation may be measured separately and independently.

Referring to FIGS. 4 and 5, the pixel circuit 114 may allow the current out of the TFTs 116 to be measured, and to be used as the measured TFT degradation data 132. The pixel circuit 114 may allow some part of the LED efficiency to be measured, and to be used as the measured TFT degradation data 132A. The pixel circuit 114 may also allow a node to be charged, and the measurement may be the time it takes for this node to discharge. The pixel circuit 114 may allow any parts of it to be electrically measured. Also, the discharge/charge level during a given time can be used for aging detection.

Figure 6:
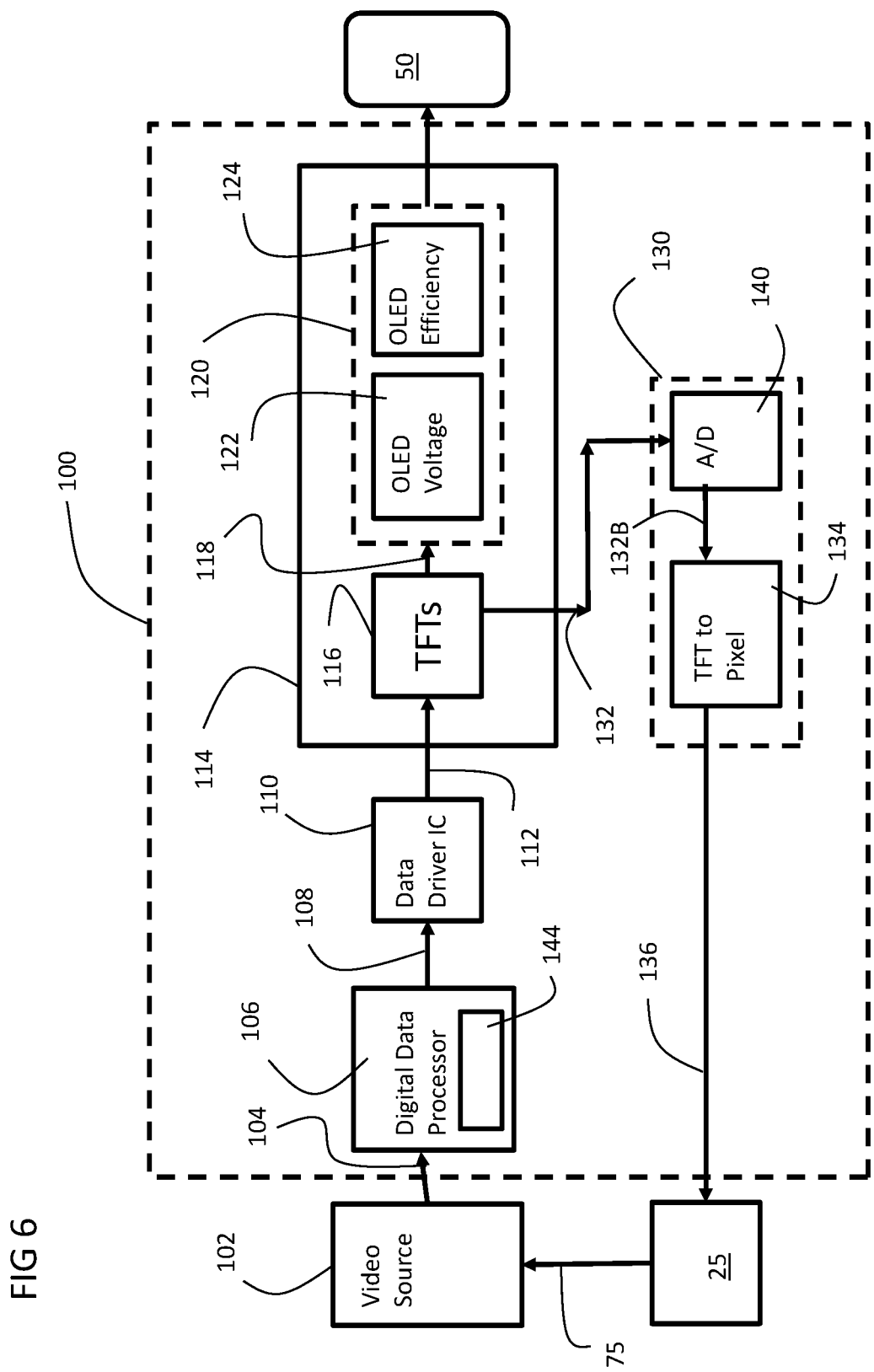
FIG. 6 is a schematic diagram of an alternate embodiment of the display system of FIG. 1.
Figure 7:
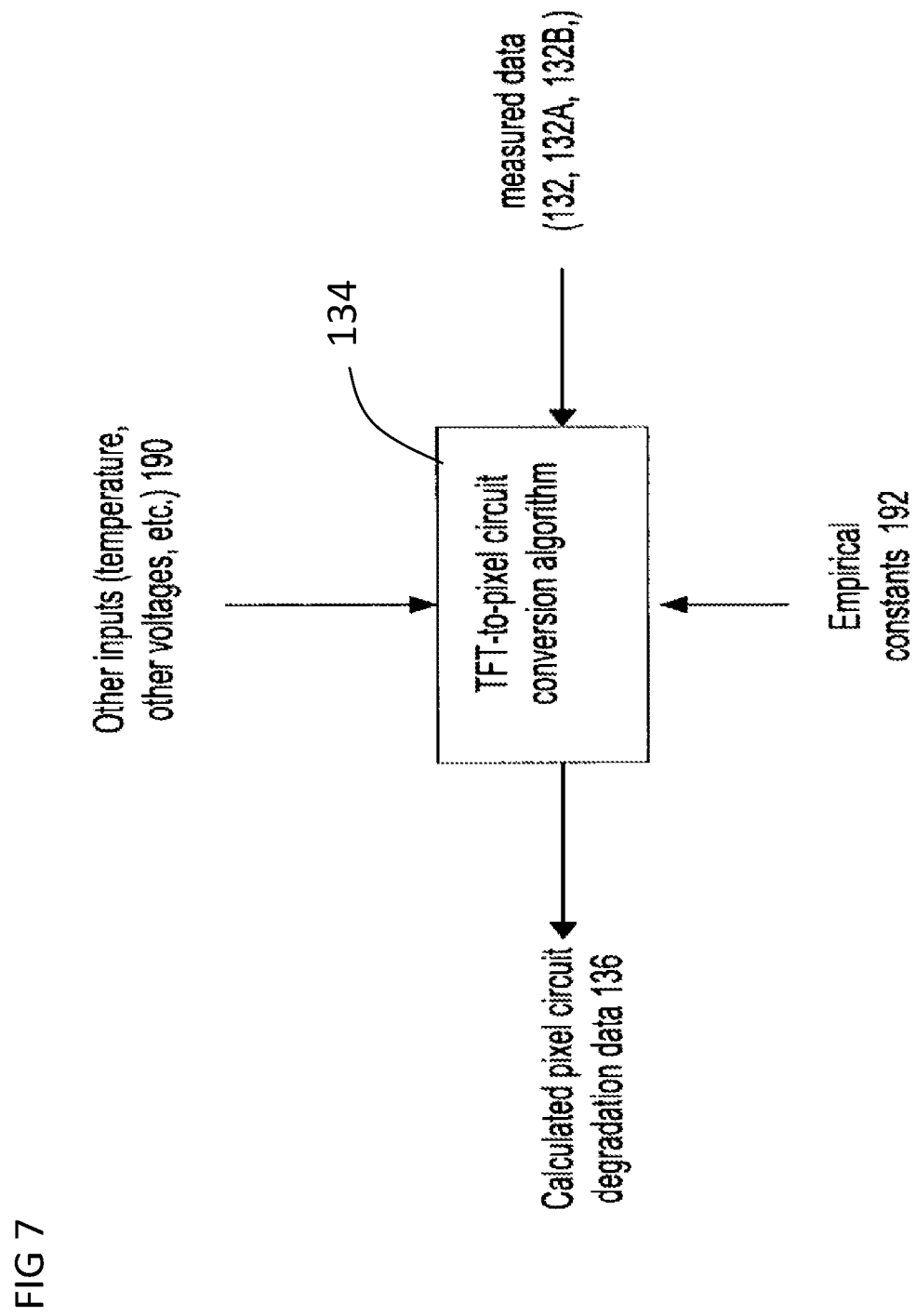
FIG. 7 is a schematic diagram of an alternate embodiment of TFT-to-pixel circuit conversion algorithm module of the display system of FIG. 4, 5 or 6.

Referring to FIG. 6, an example of modules for the compensation scheme applied to the system of FIG. 4 is described. The compensation functions module 130 of FIG. 4 includes an analog/digital (A/D) converter 140. The A/D converter 140 converts the measured TFT degradation data 132 into digital measured TFT degradation data 132B. The digital measured TFT degradation data 132B is converted into the calculated pixel circuit degradation (compensation) data 136 at the TFT-to-Pixel circuit conversion algorithm module 134. The calculated pixel circuit degradation (compensation) data 136 may be stored in the memory 25 separate or in place of the original non-uniformity data 75. Since measuring TFT degradation data from some pixel circuits may take a long time, the calculated pixel circuit degradation data 136 is stored in the memory 25 for use.

In FIG. 6, the TFT-to-pixel circuit conversion algorithm 134 may be a digital algorithm. The digital TFT-to-pixel circuit conversion algorithm 134 may be implemented, for example, on a microprocessor, an FPGA, a DSP, or another device, but not limited to these examples.

The calculated pixel circuit degradation data 136 stored in the memory 25 is always available for the digital data processor 106. Thus, the TFT degradation data 132 for each pixel 114 does not have to be measured every time the digital data processor 106 needs to use the data 132. The degradation data 132 may be measured infrequently in a random or predetermined time period, for example, once a day, once a week etc. Using a dynamic time allocation for the degradation measurement is another case, more frequent extraction at the beginning and less frequent extraction after the aging gets saturated.

The digital data processor 106 may include the compensation module 144 for taking input luminance data for the pixel circuit 114 from the video source 102, and modifying the input luminance data 104 based on degradation data 136 for that pixel circuit 114 or other pixel circuit. In FIG. 6, the module 144 modifies luminance data 104 using the initial non-uniform data 75 and/or the degradation data 136 from the memory 25.

One example of the degradation data 136 used in the module 144 of the digital data processor 106 is illustrated in FIG. 6. The output of the TFT-to-pixel circuit conversion algorithm module 134 is an integer value. This integer is stored in a table in memory 25. The location of each integer in the table is related to the pixel's location on the LED or AMOLED display. Its value is a number, and is added to the digital luminance data 104 to compensate for the degradation.

For example, digital luminance data may be represented to use 8-bits (256 values) for the brightness of a pixel. A value of 256 may represent maximum luminance for the pixel. A value of 128 may represent approximately 50% luminance. The value in the table may be the number that is added to the luminance data 104 to compensate for the degradation. Therefore, the compensation module 144 in the digital data processor 106 may be implemented by a digital adder. It is noted that digital luminance data may be represented by any number of bits, depending on the driver IC 110 used (for example, 6-bit, 8-bit, 10-bit, 14-bit, etc.).

In FIGS. 4, 5 and 6, the TFT-to-pixel circuit conversion algorithm module 134 has the measured TFT degradation data 132 or 132A as an input, and the calculated pixel circuit degradation data 136 as an output. However, there may be other inputs to the system to calculate compensation data 136 as well, as illustrated in FIG. 10. In the illustrated embodiment, the TFT-to-pixel circuit conversion algorithm module 134 processes the measured data 132 or 132A based on any one or more of additional inputs 190, e.g. temperature or other voltages, and empirical constants 192.

The additional inputs 190 may include measured parameters, such as voltage reading from current-programming pixels and current reading from voltage-programming pixels. These pixels may be different from a pixel circuit 114 from which the measured signal 132 is obtained. For example, a measurement is taken from a "pixel under test" and is used in combination with another measurement from a "reference pixel". As described below, in order to determine how to modify luminance data 104 to a pixel 114, data from other pixels in the display may be used. The additional inputs 190 may include light measurements, such as measurement of an ambient light in a room. A discrete device or some kind of test structure around the periphery of the panel may be used to measure the ambient light. The additional inputs 190 may include humidity measurements, temperature readings, mechanical stress readings, other environmental stress readings, and feedback from test structures on the panel.

The other parameters may also include empirical parameters 192, such as the brightness loss in the LED 120 due to decreasing efficiency ($\Delta L$), the shift in LED voltage 122 over time ($\Delta V_{oled}$), dynamic effects of Vt shift, parameters related to TFT performance, such as Vt, $\Delta$Vt, mobility ($\mu$), inter-pixel non-uniformity, DC bias voltages in the pixel circuit, changing gain of current-mirror based pixel circuits, short-term and long-term based shifts in pixel circuit performance, pixel-circuit operating voltage variation due to IR-drop and ground bounce.

The TFT-to-pixel-circuit conversion algorithm in the module 134 and the compensation algorithm 144 in the digital data processor 106 work together to convert the measured TFT degradation data 132 into a luminance correction factor. The luminance correction factor has information about how the luminance data 104 for a given pixel 114 is to be modified, to compensate for the degradation in the pixel 114.

In FIG. 6, the majority of this conversion is done by the TFT-to-pixel-circuit conversion algorithm module 134. The module 134 calculates the luminance correction values entirely, and the digital adder 144 in the digital data processor 106 simply adds the luminance correction values to the digital luminance data 104. However, the system 100 may be implemented such that the TFT-to-pixel circuit conversion algorithm module 134 calculates only the degradation values, and the digital data processor 106 calculates the luminance correction factor from that data. The TFT-to-pixel circuit conversion algorithm 134 may employ fuzzy logic, neural networks, or other algorithm structures to convert the degradation data into the luminance correction factor.

The value of the luminance correction factor may allow the visible light to remain constant, regardless of the degradation in the pixel circuit 114. The value of the luminance correction factor may allow the luminance of degraded pixels not to be altered at all; instead, the luminance of the non-degraded pixels to be decreased. In this case, the entire display may gradually lose luminance over time, however the uniformity may be high.

The calculation of a luminance correction factor may be implemented in accordance with a compensation of non-uniformity algorithm, such as a constant brightness algorithm, a decreasing brightness algorithm, or combinations thereof. The constant brightness algorithm and the decreasing brightness algorithm may be implemented on the TFT-to-pixel circuit conversion algorithm module 134 or the digital data processor 106. The constant brightness algorithm is provided for increasing brightness of degraded pixels so as to match non-degraded pixels. The decreasing brightness algorithm is provided for decreasing brightness of non-degraded pixels so as to match degraded pixels. These algorithm may be implemented by the TFT-to-pixel circuit conversion algorithm module 134, the digital data processor 144, or combinations thereof. It is noted that these algorithms are examples only, and the compensation of non-uniformity algorithm is not limited to these algorithms.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A method of loading image correction data for a display system used in a final product, including a memory store, comprising:

determining initial correction data for the display system to correct for initial non-uniformity prior to assembly in the final product;

storing the initial correction data in a remote memory separate from the display system and the final product;

assembling the final product including the display system, and the memory store remote from the display system;

downloading the initial correction data from the remote memory and storing the initial correction data in the memory store on the final product during the assembly of the final product; and transmitting the initial correction data from the memory store to the display system for correcting the display system.

2. The method according to claim 1, wherein the final product includes a video source;
wherein the display system includes a digital data processor configured for capable of receiving luminance data from the video source over a video interface; and
wherein the step of transmitting the initial correction data to the display system comprises transmitting the initial correction data over the video interface to a compensation processor in the digital data processor.

3. The method according to claim 2, wherein the digital data processor includes a central processing unit and a graphics unit; and
wherein the compensation processor corrects the luminance data in digital form in the central processing unit or the graphics processing unit.

4. The method according to claim 2, wherein the display system includes the digital data processor and a data driver IC configured for receiving luminance data from the video source over the video interface; and
wherein the step of transmitting the initial correction data to the display system comprises transmitting the initial correction data over the video interface to the compensation processor in the data driver IC.

5. The method according to claim 4, wherein the compensation processor corrects the luminance data in digital, voltage or current form in the data driver IC.

6. The method according to claim 2, wherein the initial correction data comprises an integer value corresponding to each pixel in the display system, which are added to the luminance data by the compensation processor to compensate for the initial non-uniformity.

7. The method according to claim 2, further comprising:
determining degradation correction data for the display system to correct for degradation effects during use in the final product;
storing the degradation correction data in the memory store in the final product;
transmitting the degradation correction data from the memory store to the display system over the video interface for correcting the display system.

8. The method according to claim 7, wherein the step of determining the degradation correction data comprises determining a degradation of each thin filmed transistor in each pixel of the display system.

9. The method according to claim 7, wherein the step of determining the degradation correction data comprises determining degradation of each organic light emitting diode in each pixel of the display system.

10. The method according to claim 7, wherein the degradation correction data comprises an integer value corresponding to each pixel in the display system, which are added to the luminance data by the compensation processor to compensate for the degradation effects.

11. A display system including a plurality of pixels for use in a video displaying product, which includes a video source and a memory store including initial correction data for the display system to correct initial non-uniformity in the plurality of pixels, the display system comprising:
a digital data processor for receiving luminance data in digital form from the video source over a video interface;
a data driver IC for converting the luminance data from digital form to voltage or current form;
a plurality of pixel circuits, each including a thin film transistor (TFT) and a light-emitting diode (LED) for converting the voltage or current into visible light;
a compensation processor configured for requesting the initial correction data from the memory store in the video display product remote from the display system, receiving the initial correction data from the memory store over the video interface; and adjusting the luminance data to correct the display system using the initial correction data.

12. The display system according to claim 11, wherein the digital data processor includes a central processing unit and a graphics processing unit; and
wherein the compensation processor is configured to correct the luminance data in digital form in the central processing unit or the graphics processing unit.

13. The display system according to claim 11, wherein the compensation processor is comprised in the data driver IC.

14. The display system according to claim 13, wherein the compensation processor corrects the luminance data in voltage or current form in the data driver IC.

15. The display system according to claim 11, wherein the initial correction data comprises an integer value corresponding to each pixel in the display system, which are added to the luminance data by the compensation processor to compensate for the initial non-uniformity.

16. The display system according to claim 11, further comprising a compensation functions processor configured for:
determining degradation correction data for the display system to correct for degradation effects during use in the video displaying product; and
storing the degradation correction data in the memory store in the video displaying product;
receiving the degradation correction data from the memory store for correcting the display system.

17. The display system according to claim 16, wherein the compensation functions processor is also configured for determining degradation of each thin filmed transistor in each pixel of the display system.

18. The display system according to claim 16, wherein the compensation functions processor is also configured for determining degradation of each organic light emitting diode in each pixel of the display system.

19. The display system according to claim 16, wherein the degradation correction data comprises an integer value corresponding to each pixel in the display system, which are added to the luminance data by the compensation processor to compensate for the degradation effects.

20. A video display product, comprising:
a display system including a plurality of pixel circuits;
a video source for transmitting luminance data to the display system;
a memory store including initial correction data to correct initial non-uniformity in the plurality of pixels for the display system remote from the display system;
a user interface for inputting commands from a user;
a control processor for controlling interaction between the user interface, the video source and the display system;
wherein the display system comprises:
a digital data processor for receiving the luminance data in digital form from the video source over a video interface;
a data driver IC for converting the luminance data from digital form to voltage or current form;

the plurality of pixel circuits, each including a thin film transistor (TFT) and a light-emitting diode (LED) for converting the voltage or current into visible light; and a compensation processor configured for requesting the initial correction data from the memory store in the video display product remote from the display system; receiving the initial correction data from the memory store over the video interface; and adjusting the luminance data to correct the display system using the initial correction data.

* * * * *